Feb. 4, 1930.                    W. B. ARKLAY                    1,746,138
                                ADVERTISING DEVICE
                                 Filed May 8, 1929
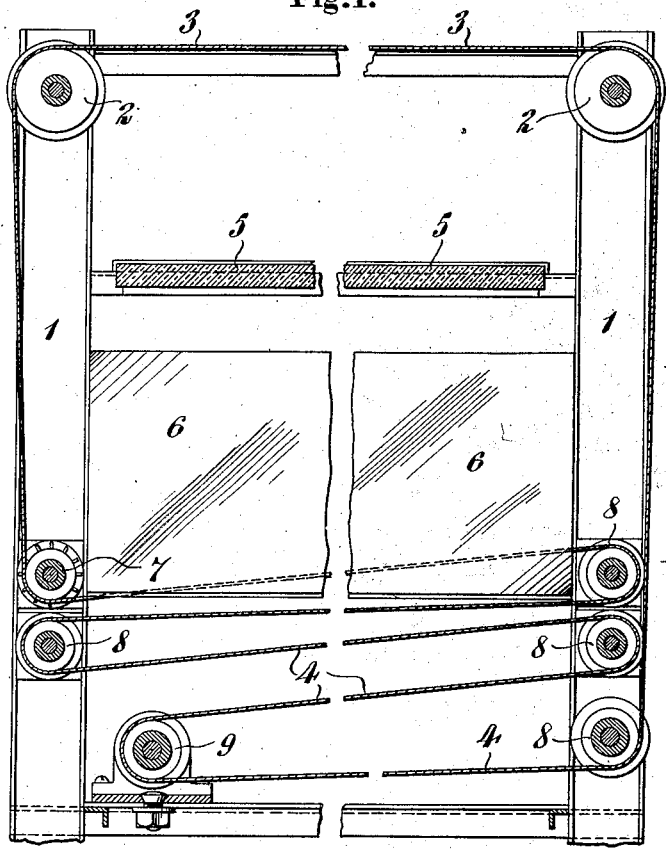
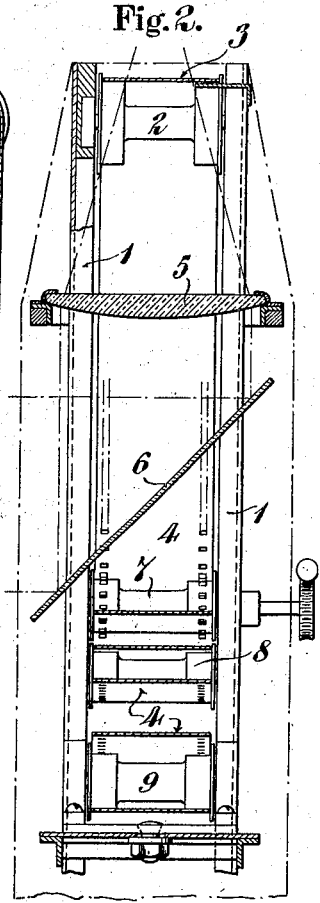
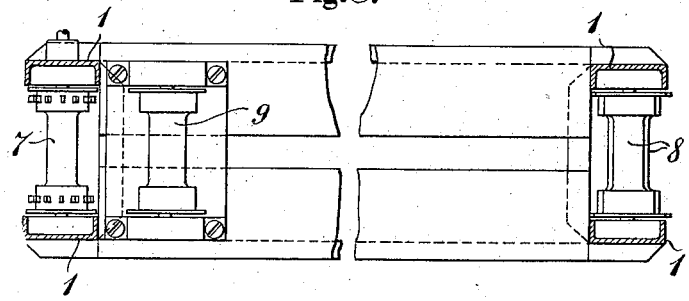
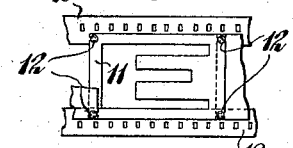
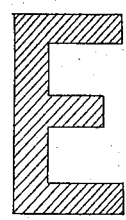
Inventor
William Bissett Arklay
By Dowell and Dowell
Attorneys Patented Feb. 4, 1930

1,746,138

UNITED STATES PATENT OFFICE

WILLIAM BISSETT ARKLAY, OF HAMPSTEAD, LONDON, ENGLAND

ADVERTISING DEVICE

Application filed May 8, 1929, Serial No. 361,322, and in Great Britain March 12, 1928.

This invention relates to advertising signs of the kind wherein light passing through a transparency or the like is received directly by a mirror and reflected to the eyes of the observer, the transparency being interposed between the mirror and the source of light.

The invention consists in the provision of improved means for use when animating such signs so that legends, news or the like can be displayed gradually.

According to the present invention light is caused to pass through part of a transparency in the form of a relatively narrow endless film or band situated at some distance from an optical element or elements adapted to produce divergence of the rays only in planes at right angles to the direction of travel of the film or band, so that an observer in front of the mirror perceives in the reflecting surface images larger in one direction than they actually are upon the transparency. To compensate for this increase in dimension in width of parts of letters for example, measured transversely of the film or band, is reduced, so that the observed result is the same or substantially the same as that which would accrue from the use of normal symbols on a wider film.

Taking the specific case of a daylight sign where a mirror in a horizontal casing is illuminated from above, a cylindrical lens may be arranged with the convex surface exposed to the mirror, and the flat or substantially flat surface horizontally thereabove. In, or associated with this casing are a number of rollers, one or more of which may be of sprocket type, adapted to cause an endless film to travel in such a way that a portion includes, or is more or less closely adjacent to, the focus of the lens, suitable means being provided to enable adjustment to be readily effected. Upon this film may be photographically printed, or otherwise produced, symbols such as letters appearing side by side along the film each letter being of the width corresponding to that which it is to assume in the mirror, but of a height much reduced. The effect of the lens is to produce divergence of the rays meridianally and so cause the letters or the like to appear as of normal height.

The movement of the film may be secured in various ways, but conveniently by means of a small electric motor and the whole may be enclosed in a weather tight casing of any suitable form.

In the accompanying drawings one constructional arrangement is illustrated by way of example, from which modifications can be readily ascertainable. Of these drawings Figs. 1 and 2 are sectional elevations at right angles to one another, and Fig. 3 is a horizontal section. Fig. 4 is a plan view of a portion of an endless band which may be used, and Fig. 5 represents the image resulting from the letter depicted in Fig. 4.

As shown in Figs. 1, 2 and 3, a frame 1 is employed upon which are mounted a pair of guide rollers 2 so that a portion 3 of an endless film band 4 can be caused to travel parallel to and above a lens 5 of the kind referred to, 6 being a reflecting mirror upon which appear images of letters or the like upon the band. Motion is imparted to the band by a sprocket wheel 7 and the required length is accommodated by idle rollers of which there may be any suitable number, four designated 8 being shown as fixed and one, designated 9, being adjustable to take up slack. Fig. 4 exemplifies how a letter is shortened in height to enable an image like that shown in Fig. 5 to be obtained. Fig. 4 further explains how an endless band can be built up of a number of film elements instead of employing an endless film. Here two feed tapes 10 are simultaneously driven by a sprocket 7 and each letter is formed as a transparency upon a film plate 11 having notches in the transverse margins which when the plate is bent can be sprung under headed studs 12 upon the tapes, being thereafter automatically held in position, one plate slightly overlapping another. This method of producing a band has the advantage of enabling changes to be more readily made in the matter to be displayed. The sprocket 7 is instanced as driven by worm and worm gearing but any other suitable drive may be employed.

What I claim is:—

1. An advertising device of the kind herein referred to, comprising a relatively narrow transparency exposed on one side to light rays, a reflector at the opposite side of such transparency and inclined thereto and a cylindrical lens situated at some distance from the transparency between the latter and the reflector adapted to produce divergence of light rays received from the transparency, only in planes at right angles to the length of the transparency so that an abserver in front of the reflector perceives in the reflecting surface images larger in one direction than they actually are upon the transparency.

2. An advertising device of the kind herein referred to, comprising a relatively narrow endless transparency exposed on one side to light rays, a reflector at the opposite side of such transparency and inclined thereto, and a cylindrical lens situated at some distance from the transparency, between the latter and the reflector, such lens being adapted to produce divergence of rays received from the transparency, only in planes at right angles to the length of the transparency.

Signed at London this 24th day of April, 1929.

WILLIAM BISSETT ARKLAY.